United States Patent [19]

Fenton et al.

[11] 4,380,610

[45] Apr. 19, 1983

[54] POLYACETAL COMB POLYMERS

[75] Inventors: Jeff T. Fenton; Mark P. Mack, both of Ponca City, Okla.

[73] Assignee: Conoco Inc., Ponca City, Okla.

[21] Appl. No.: 332,416

[22] Filed: Dec. 21, 1981

[51] Int. Cl.$^3$ .......................... C08G 6/00; C08L 61/02
[52] U.S. Cl. ..................................... 525/400; 525/401; 528/240; 528/241; 528/246; 528/248; 528/270
[58] Field of Search ............... 528/246, 240, 241, 248, 528/270; 525/400, 401

[56] References Cited

U.S. PATENT DOCUMENTS

| | | | |
|---|---|---|---|
| 3,293,218 | 12/1966 | Sidi | 528/246 |
| 3,378,527 | 4/1968 | Case et al. | 528/246 |
| 3,403,134 | 9/1968 | Wilson et al. | 528/246 |
| 3,408,332 | 10/1968 | Wolf | 528/246 |
| 3,457,233 | 7/1969 | Ishida et al. | 528/246 |
| 3,506,616 | 4/1970 | Wolf | 528/246 |

Primary Examiner—Lucille M. Phynes
Attorney, Agent, or Firm—Cortlan R. Schupbach, Jr.

[57] ABSTRACT

This invention relates to "comb" polymers having high molecular weight and related structurally to polyoxymethylene, but having improved thermal stability. In addition, this invention relates to a method for preparing these high molecular weight "comb" polymers and teaches a process which exhibits reduced reactor fouling and produces a free-flowing powder. Generally the improved polymer is made by copolymerizing trioxane with polyanhydride or copolymerizing trioxane with copolymers of olefins and anhydrides. The improved polymer can optionally be reacted with agents known to react with terminal hydroxy groups to end-cap the polymer.

14 Claims, No Drawings

POLYACETAL COMB POLYMERS

This invention relates toward novel high molecular weight polyacetal "comb" polymers related to polyoxymethylene polymers but having improved thermal stability over the known polymers. In addition, a method is taught which exhibits reduced reactor fouling and produces a free-flowing powder. More specifically, the improved polymer is made by copolymerizing trioxane and polyanhydride or copolymerizing trioxane and copolymers of olefins and anhydrides.

Polyoxymethylene polymers having the general formula $HO\text{-}[CH_2O]_h\text{-}H$ are well known in the art. These materials are prepared by the polymerization of anhydrous formaldehyde or by the polymerization of trioxane, the cyclic trimer of formaldehyde. Polyoxymethylene polymers vary in thermal stability (which is usually reported as $K_{222}$ or weight percent lost per minute at 222° C. under nitrogen) and in molecular weight. Polyoxymethylene polymers prepared in this manner suffer from relatively high thermal instability, giving high values for $K_{222}$. These high thermal instabilities are caused by polymer decomposition which yields free formaldehyde and results in lower molecular weight polymers which continue to decompose. It has long been known that most polyoxymethylene polymers require stabilization in order to produce useful molded or extruded plastic articles. Many methods have been conceived to overcome this deficiency. The most common methods include polymer post treatment by end-capping terminal hydroxy groups of the polyoxymethylene, usually with acid anhydrides to prevent loss of formaldehyde as set forth in U.S. Pat. No. 3,046,251, or by copolymerizing with monomers which impart thermal stability to the polymer. Examples of such monomers include cyclic ethers. U.S. Pat. No. 3,457,233 teaches copolymerization of trioxane with an unsaturated aliphatic dicarboxylic acid. These materials are not polymers but are polymeric precursors. U.S. Pat. No. 3,218,295 discloses polymeric materials which are reacted with trioxane. These polymeric materials have the formula X-R-X where X is an active hydrogen-containing group selected from —OH,—SH,—COOH, and —NH$_2$. U.S. Pat. No. 3,378,527 shows a tertiary copolymer with esters and ether linkages and containing hydroxy or carboxy terminated groups. U.S. Pat. No. 3,366,561 teaches a process of polymerizing trioxane with cyclic ethers.

Most often trioxane is polymerized by a cationic mechanism utilizing catalysts which are coordination complexes of boron trifluoride such as boron trifluoride-ethyl ether. Other cationic compounds, however, will also polymerize these compounds and in general include the inorganic fluorine compounds. Polymerizations carried out with trioxane as practiced in the art may be conducted in suspension, solution, or as a melt. Polymerization of molten trioxane is very rapid but yields solid masses of polymer which are very difficult to process. Polymerization in solution or suspension yields more easily worked polymer, yet occurs at a very slow rate.

It would therefore be of great benefit to provide a method for imparting thermal stability to copolymers related to polyoxymethylene and to provide novel polymers having high thermal stability, easy processability, and provide a method for obtaining these materials quickly while encountering low reactor fouling.

It is therefore an object of the present invention to provide novel "comb" polymers related to polyoxymethylene having improved thermal stability over known polyoxymethylene and to provide a process for the preparation of these materials. Other objects will become apparent to those skilled in this art as the description proceeds.

It has now been discovered according to the instant invention that novel "comb" polymers having a carbon-to-carbon backbone linkage and pendant therefrom chains of polymers closely spaced along the carbon-to-carbon backbone to form pendant groups very like the teeth in a comb; hence the name "comb" polymers.

The novel comb polymers of the present invention having a carbon-to-carbon backbone linkage and pendant chains to form a comb-like polymer contain at least one structure selected from the group consisting of (a)
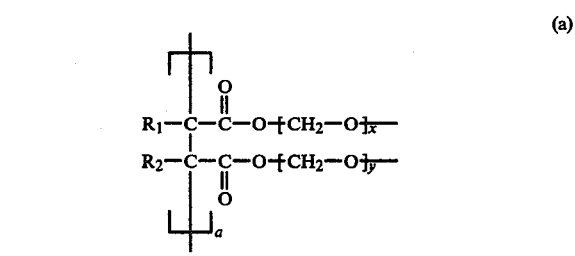

(b)
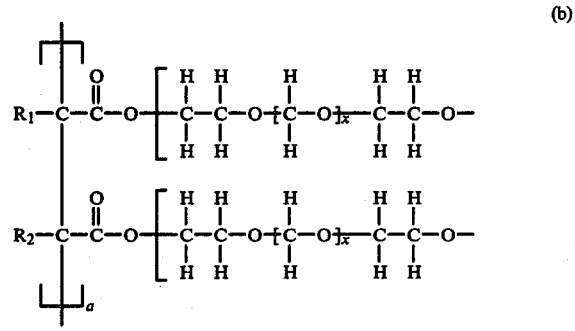

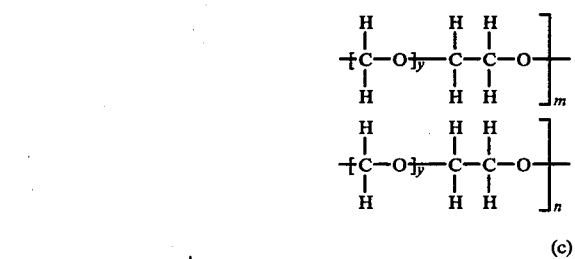

(c)
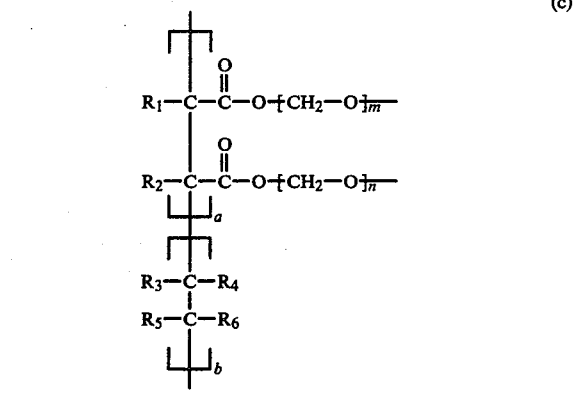

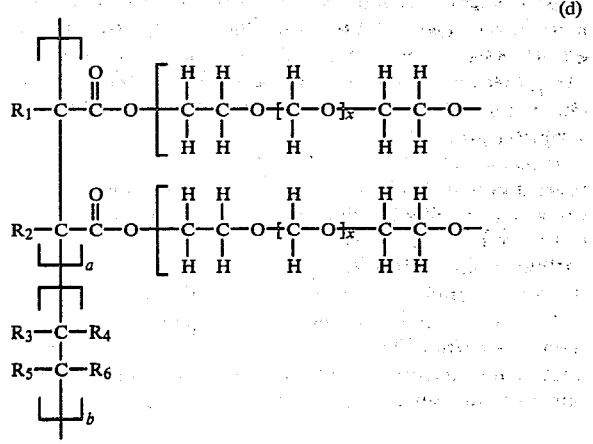

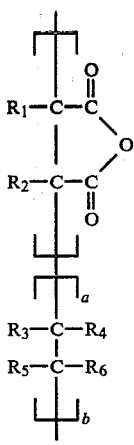

wherein $R_1$, $R_2$, $R_3$, $R_4$, $R_5$ and $R_6$ are, independently, hydrogen, cycloalkyl groups containing from 6 to 24 carbon atoms, alkyl groups containing from 1 to 20 carbon atoms, substituted alkyl groups or cycloalkyl groups containing from 1 to 30 carbon atoms, aryl groups containing from 6 to 20 carbon atoms or halogen, and wherein $x+y>100$, a and b are $>25$, and m and $n>1$.

In addition, the comb polymers of the instant invention also comprise blends of polymers having units of the general formula (e)

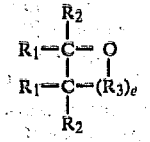

when such polymers are mixed, blended or copolymerized with a polymer having the general formula (2) or (3), where (2) has the general formula $HO{-}[CH_2{-}O]_h{-}H$

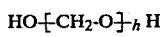

where h is $>10$ and (3) has the general formula

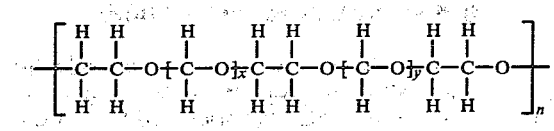

and wherein $R_1$, $R_2$, $R_3$, $R_4$, $R_5$ and $R_6$ are, independently, hydrogen, alkyl groups containing from 1 to 20 carbon atoms cycloalkyl groups containing from 6 to 24 carbon atoms, substituted alkyl groups containing from 1 to 30 carbon atoms, aryl groups containing from 6 to 20 carbon atoms, or halogen and wherein $x+y>100$ and m and $n>1$.

Greatly improved heat stability is obtained when the polymers are bonded by polymerization or blended by mixing. Polymers obtained by polymerization are preferred, since ratios and uniformity are more easily controlled. The present invention also provides a polymerization method which results in a free-flowing polymer, and results in a very clean reactor vessel. In addition the laborious and time consuming multiple polymerizations, reactor cleanings and blending operations of the prior art are eliminated. Polymers produced by direct polymerization in addition have different physical properties then blended polymers.

The polymers of this invention are obtained by preparing a copolymer of terpolymer by reacting trioxane with from about 0.001 to about 15.0 weight percent polyanhydride in the presence of a suitable catalyst. The instant invention utilizes the polymerization between trioxane and polyanhydride polymers to give polyoxymethylene type polymers of unique structure.

If desired, the reaction can be carried out in conjunction with from about 0.1 to about 15.0 mole percent of a cyclic ether having at least 2 adjacent carbon atoms, wherein the cyclic ether has the general formula $$\begin{array}{c} R_2 \\ | \\ R_1{-}C{-}O \\ | \quad \quad | \\ R_1{-}C{-}(R_3)_e \\ | \\ R_2 \end{array}$$

wherein $R_1$ and $R_2$ are, independently, hydrogen or alkyl groups containing from 1 to 20 carbon atoms, halogen substituted alkyl groups containing from 1 to 20 carbon atoms, $R_3$ is methylene, oxymethylene, of halogen-substituted methylene or oxymethylene, and e ranges from 0 to 3.

Suitable catalysts for the process of the present invention are, in general, inorganic fluoride catalysts. Representative examples of such catalysts are boron trifluoride, antimony trifluoride, antimony fluoroborate, bismuth trifluoride, aluminum trifluoride, hydrogen fluoride, fluoral, sulfuric acid, and boron trifluoride-ethyl etherate complex.

Normally, the catalyst will be present in the reaction mixture at levels of at least 0.001% by weight based on the weight of trioxane and can be present at any desired level. However, normally the catalyst will not be present at levels greater than about 10% by weight based on the weight of trioxane.

Normally the reactions of the present invention are carried out at temperatures of from about 50° C. to about 90° C. but reactions at temperatures of about 55° to 77° C. are most preferred.

When carrying out the polymerizations of the present invention, the polymeric acid anhydrides, copolymers of olefins and anhydrides, or mixtures of these materials which are copolymerized with trioxane are present in the polymerization mixture at concentrations of from about 0.001 to about 15.0% by weight based on the total trioxane present in the polymerization mixture.

If desired, the polymerization reaction can be carried out in a solvent which is common to all reactants used during polymerization. Representative but non-exhaustive examples of suitable solvents for the process of the present invention are aliphatic hydrocarbons, cycloaliphatic hydrocarbons, aromatic hydrocarbons, halogenated hydrocarbons, ethers, and mixtures of these. Representative but nonexhaustive individual examples of these solvents are cyclohexane, benzene, ethylene dichloride, pentane, carbon tetrachloride, diethylether, methylene chloride, and mixtures of these.

Preferred reactions according to the process of the present invention involve polymerization of trioxane with a copolymer of an olefin and maleic anhydride. A representative example of this preferred type of reactant has the general formula

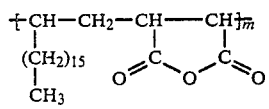

wherein m is greater than 100. In this preferred embodiment, the trioxane, polyanhydride, and optional cyclic ether are dissolved in a common anhydrous solvent such as cyclohexane and allowed to react after initiation with an inorganic fluoride catalyst complex. The temperature of the reaction is raised to the range of from about 50° C. to about 90° C. and reaction is allowed to proceed to the extent desired, normally from about 5 seconds to about 3 hours. Pressure is not critical other than a convenient pressure, but normally atmospheric pressure is preferred. Pressures above and below ambient can be used in the polymerization process of the present invention.

The invention is more concretely described with reference to the examples below wherein all parts and percentage are by weight unless otherwise specified. Examples are provided to illustrate the present invention and not to limit it.

EXAMPLE 1

A reaction between 0.25 grams of polyanhydride (maleic anhydride/octadecene-1 copolymer, Trademark of and sold by Gulf Chemical Co. as Gulf Polyanhydride PA-18) and 11.18 grams of trioxane was conducted in a 3-neck round bottom flask equipped with a reflux condenser and a thermometer. The reaction was placed under an argon atmosphere. Ten milliliters (ml) of cyclohexane were added and the reactants dissolved at 65° C. Boron trifluoride diethyletherate catalyst (0.113 weight percent based on trioxane) was then added. Polymerization began immediately and the reaction appeared complete after about 30 seconds. The polymer formed was easily removed from the flask in about 72% yield, based on the combined weight of trioxane and polyanhydride. The resultant polymer had a $K_{222}$ of 1.359 and a melting point of 190° C. The polymer has a structure defined by (c) in the previous description.

In contrast a trioxane homopolymer prepared in a similar manner except that no polyanhydride was present was removed from the reaction flask with great difficulty and showed a $K_{222}$ of 3.481 and a melting point of 191° C.

EXAMPLE 2

To 15.90 g of trioxane in a 3-neck round bottom flask was added 0.28 g of polyanhydride (maleic anhydride/octadecene-1 copolymer, Trademark of and sold by Gulf Chemical Co. as Gulf Polyanhydride PA-18). The flask was flushed with argon, followed by the addition of anhydrous cyclohexane. Next, 0.85 ml of anhydrous 1,3-dioxolane were added and the flask fitted with a thermometer and condensor. The system was brought to solution at about 69° C. After solution was achieved, 11 ml of $BF_3$-diethyletherate complex were added to initiate polymerization. After reacting 2.5 hours, the system was quenched with water. The polymer was collected and washed with hot water and acetone. Polymer yield was 83.4% with a $k_{222}=0.862$ weight percent per minute.

Thus the present invention provides novel comb polymers based on polyoxymethylene linkages which are highly thermal stable, produced in polymerization reactions and leaving little reactor fouling and which yield polymers based on the reaction of trioxane and copolymers of acid anhydrides of olefins and anhydrides.

The effect of simple mechanical blending as opposed to copolymerization was demonstrated.

EXAMPLE 3

A mortar and pestle was used to crush 0.55 gram of trioxane homopolymer ($K_{222}$ of 2.67 weight percent per minute loss) with 0.02 gram polyanhydride (Gulf Polyanhydride PA-18, trademark of and sold by Gulf Chemical Co.). The resulting blend exhibits a $K_{222}$ of 0.564 weight percent per minute. This example illustrates the polymer blends previously described, specifically structure (e) with structure (2).

The comb polymers of the present invention can be further stabilized by capping pendant chains. Such capping can be carried out using methods knwon to those skilled in the art. A representative example of capping effective for the polymers of the present invention is the use of an acid anhydride such as acetic anhydride. The "comb" polymer is reacted with acetic anhydride by heating to reflux temperature for from about 15 minutes to about four hours in the presence of a basic catalyst such as sodium acetate. The reaction places an acetate group at the end of all polymer chains.

While certain embodiments and details have been shown for the purpose of illustrating this invention, it will be apparent to those skilled in this art that various changes and modifications may be made herein without departing from the spirit or scope of the invention.

We claim:

1. Comb polymers having a carbon-to-carbon backbone linkage and pendant polymer chains wherein the polymer contains at least one structure selected from the group consisting of (a)
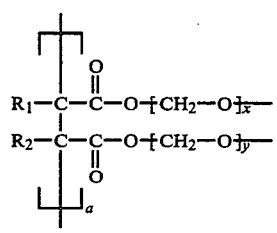

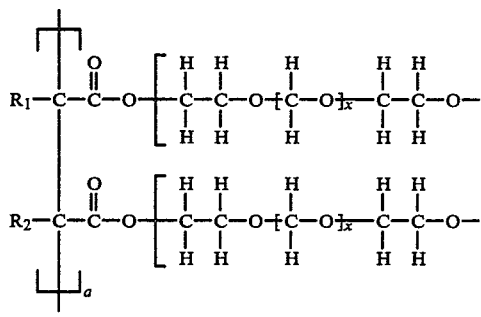

(c)
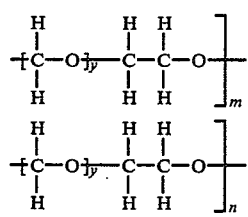

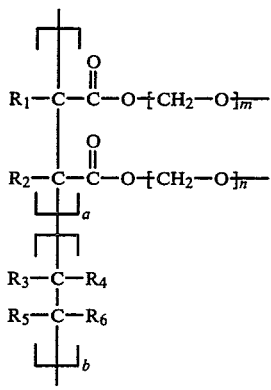

(d)
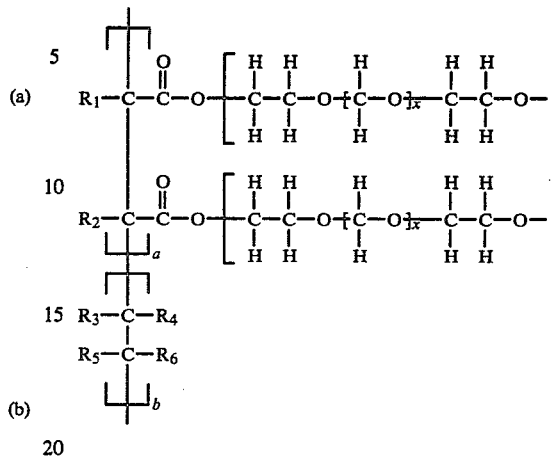

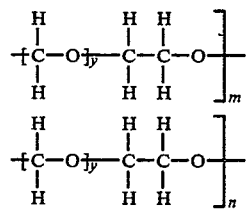

wherein $R_1$, $R_2$, $R_3$, $R_4$, $R_5$ and $R_6$ are, independently, hydrogen, cycloalkyl groups containing from 6 to 24 carbon atoms, alkyl groups containing from 1 to 20 carbon atoms, substituted alkyl groups containing from 1 to 30 carbon atoms, aryl groups containing from 6 to 20 carbon atoms or halogen, and wherein $x+7>100$, a and b are $>25$, $m>1$ and $n>1$.

2. A comb polymer as described in claim 1 wherein the polymer comprises units of the general formula (1)
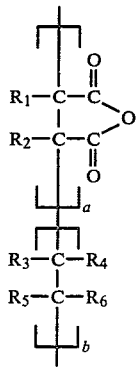

and wherein said polymer is blended with a polymer having the general formula (2) or (3) or mixtures of these, where (2) has the general formula $$HO \text{---} [CH_2\text{-}O]_h \text{---} H$$

and (3) has the general formula

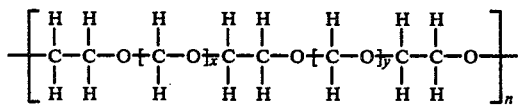

and wherein $R_1$, $R_2$, $R_3$, $R_4$, $R_5$ and $R_6$ are, independently, hydrogen, alkyl groups containing from 1 to 20 carbon atoms, cycloalkyl groups containing from 6 to 24 carbon atoms, substituted alkyl groups containing from 1 to 30 carbon atoms, aryl groups containing from 6 to 20 carbon atoms, or halogen and wherein $x+y>100$, $n>1$ and $h>10$.

3. A method for preparing polymers having a carbon-to-carbon backbone and having polymeric pendant chains attached thereto, comprising copolymerizing trioxane and at least one material selected from the group consisting of polymeric acid anhydrides, copolymers of olefins and anhydrides, or mixtures of these, wherein the copolymerization is carried out in the presence of an inorganic fluoride catalyst at temperatures of from about 0° C. to about 200° C.

4. A method as described in claim 3 wherein the catalyst is selected from the group consisting of boron fluoride, boron trifluoride, antimony fluoroborate, bismuth trifluoride, aluminum trifluoride, hydrogen fluoride, fluorosulfuric acid and boron trifluoride ethyl etherate.

5. A method as described in claim 4 wherein the boron fluoride catalyst comprises a coordination complex using oxygen, sulfur or both as the coordinating atoms.

6. A method as described in claim 5 whereinthe temperature is from about 50° C. to about 90° C.

7. A method as described in claim 6 wherein the catalyst is present at levels of at least 0.001% by weight based on the weight of trioxane.

8. A method as described in claim 7 wherein the polymeric acid anhydride, copolymers of olefins and anhydrides, or mixtures of these which are copolymerized with trioxane are present at concentrations of from about 0.001 to about 15.0% by weight based on the total trioxane.

9. A method as described in claim 8 wherein a solvent common to all reactants is used during polymerization.

10. A method as described in claim 9 wherein the solvent is an anhydrous solvent selected from the group consisting of aliphatic hydrocarbons, cycloaliphatic hydrocarbons, aromatic hydrocarbons, halogenated hydrocarbons, ethers and mixtures of these.

11. A method as described in claim 10 wherein the solvent is selected from the group consisting of cyclohexane, benzene, ethylene dichloride, pentane, carbon tetrachloride, diethyl ether, methylene chloride, and mixtures of these.

12. A method as described in claim 8 wherein in addition a cyclic ether of the general formula

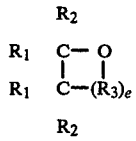

is copolymerized with trioxane and polymeric acid anhydrides, copolymers of olefins and anhydrides and mixtures of these wherein $R_1$ and $R_2$ are, independently, hydrogen, alkyl groups containing from 1 to 20 carbon atoms, halogen substituted alkyl groups containing from 1 to 20 carbon atoms, $R_3$ is methylene, oxymethylene, or halogen substituted methylene or oxymethylene, and e ranges from 0 to 3.

13. A method as described in claim 12 wherein the cyclic ether is present in the polymerization medium at levels of from about 0.1% to about 15.0 percent by weight based on the weight of trioxane.

14. A method as described in claim 13 wherein the cyclic ether is selected from the group consisting of ethylene oxide, propylene oxide and 1,3-dioxolane.

* * * * *

UNITED STATES PATENT AND TRADEMARK OFFICE
CERTIFICATE OF CORRECTION

PATENT NO. : 4,380,610
DATED : April 19, 1983
INVENTOR(S) : Jeff T. Fenton and Mark P. Mack It is certified that error appears in the above-identified patent and that said Letters Patent are hereby corrected as shown below:

Column 8, line 37, "7" should be --y--.

Claim 12, Each $R_1$ should have a bond connecting to C.

Signed and Sealed this

Twelfth Day of July 1983

[SEAL]

Attest:

GERALD J. MOSSINGHOFF

Attesting Officer

Commissioner of Patents and Trademarks